(12) United States Patent
Yang et al.

(10) Patent No.: US 7,889,500 B2
(45) Date of Patent: Feb. 15, 2011

(54) PORTABLE ELECTRONIC DEVICE

(75) Inventors: Chih-Hao Yang, Taipei Hsien (TW);
Jui-Wen Hung, Taipei Hsien (TW);
Ching-Bai Hwang, Taipei Hsien (TW)

(73) Assignee: Foxconn Technology, Co., Ltd.,
Tucheng, Taipei County (TW)

( * ) Notice: Subject to any disclaimer, the term of this patent is extended or adjusted under 35 U.S.C. 154(b) by 0 days.

(21) Appl. No.: 12/482,402

(22) Filed: Jun. 10, 2009

(65) Prior Publication Data

US 2010/0014249 A1    Jan. 21, 2010

(30) Foreign Application Priority Data

Jul. 18, 2008    (CN) .................. 2008 1 0302800

(51) Int. Cl.
*H05K 7/20*    (2006.01)
(52) U.S. Cl. ...................... 361/695; 361/694
(58) Field of Classification Search ...............
361/679.46–679.51, 694, 695; 454/184
See application file for complete search history.

(56) References Cited

U.S. PATENT DOCUMENTS 6,181,555 B1 * 1/2001 Haley et al. ............ 361/679.21
6,459,573 B1 * 10/2002 DiStefano et al. ...... 361/679.46
7,411,782 B2 * 8/2008 Kuo ........................ 361/679.55
7,733,644 B2 * 6/2010 Wilson et al. ........... 361/679.49
2006/0094347 A1 * 5/2006 Tracy et al. ................. 454/184

FOREIGN PATENT DOCUMENTS

CN        1782949 A       6/2006
CN      101187384 A       5/2008

* cited by examiner

*Primary Examiner*—Gregory D Thompson
(74) *Attorney, Agent, or Firm*—Frank R. Niranjan

(57) ABSTRACT

A portable electronic device includes a main body and a centrifugal fan. The main body includes a bottom wall, an opposite top wall and a side wall connecting the top wall with the bottom wall. The bottom wall, the top wall and the side wall cooperatively define a space in the main body. A groove is defined in the top wall for communicating the space with an outside environment of the main body. The top wall is provided with an active cover plate corresponding to the groove. The cover plate is capable of moving upwardly relative to the top wall to define an air intake between the cover plate and the top wall. A centrifugal fan is received in the space of the main body. The centrifugal fan sucks air into the space from the outside environment via the air intake and the groove.

11 Claims, 7 Drawing Sheets

PORTABLE ELECTRONIC DEVICE

BACKGROUND

1. Technical Field

The present disclosure relates to electronic devices, and more particularly to a portable electronic device with high heat dissipating efficiency.

2. Description of Related Art

Electronic components operating at high speed generate excessive heat which must be displaced efficiently to ensure normal operation. Typically, a heat dissipation device provides such heat dissipation.

Conventionally, the heat dissipation device includes a fin unit absorbing heat from the electronic components and a fan to produce an airflow in order to remove heat from the fin unit. Since most of portable electronic devices such as a laptop computer, or a notebook computer containing the electronic components therein do not have enough space therein, a centrifugal fan which requires only a small space for installation is generally used. The centrifugal fan includes a housing, a hub and a plurality of blades extending radially from the hub. The housing defines first and second air inlets at top and bottom surfaces thereof, respectively. The portable electronic device includes a casing for receiving the centrifugal fan and the electronic components therein.

For insuring an amount of the airflow from the first and second air inlets of the centrifugal fan and also a mounting requirement of the centrifugal fan in the casing, a clearance must be defined between each of the top and bottom surfaces of the housing and top and bottom surface of the casing, which conflicts with the requirement for the centrifugal fan make use of the limited space in the casing of the portable electronic devices. Additionally, cooling air outside of the casing can not flows into the air inlets of the centrifugal fan due to enclosure of the casing, and most of hot air after cooling the electronic components remains inside the casing and can not escape to an exterior of the casing. The hot air within the casing results in temperature increasing of interior air of the casing, and finally a heat exchange between the interior air and the fin unit is decreased, often does not satisfy heat dissipation requirement of the portable electronic device.

For the foregoing reasons, therefore, there is a need in the art for a portable electronic device which overcomes the above-mentioned problems.

DETAILED DESCRIPTION

Figure 1:
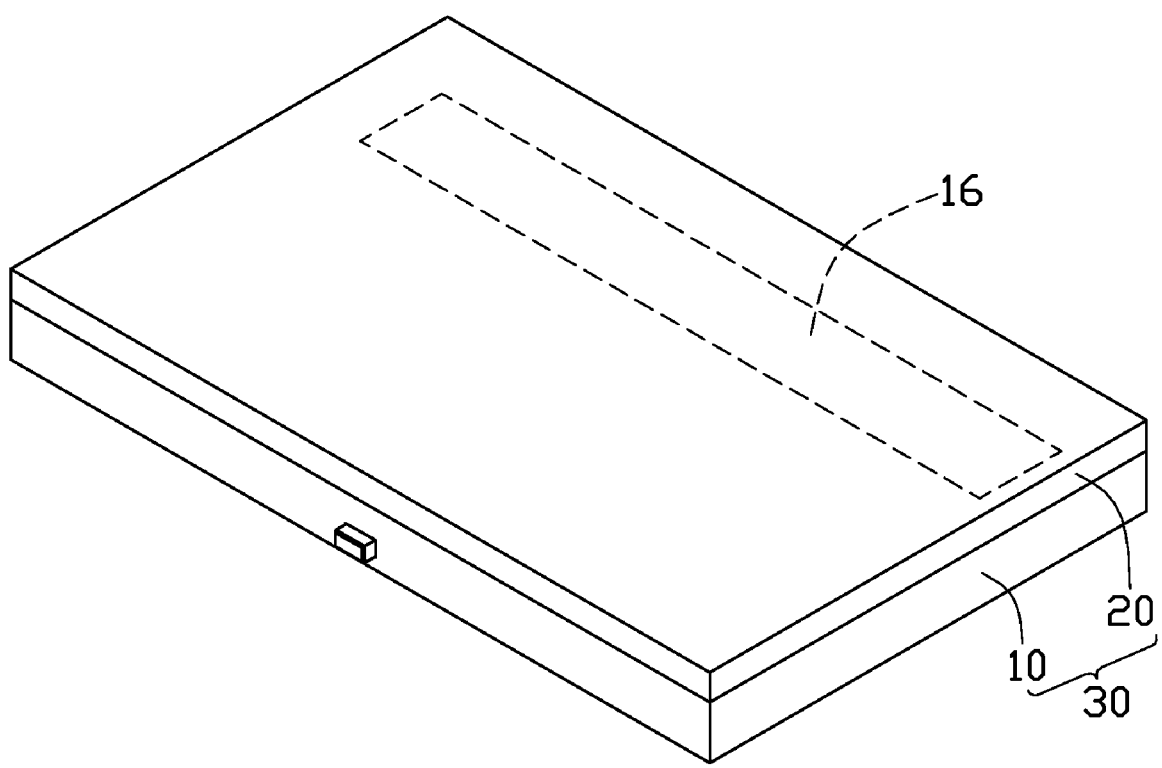
FIG. 1 is a schematic, assembled view of a portable electronic device in accordance with a first embodiment.

Reference will now be made to the drawing figures to describe the present portable electronic device in detail.

Referring to FIG. 1, a portable electronic device 30 in accordance with a first embodiment of the disclosure is shown. The portable electronic device 30 is a notebook computer as an example, which includes a main body 10 and a display unit 20 pivotably connected to a rear side edge of the main body 10.

Figure 2:
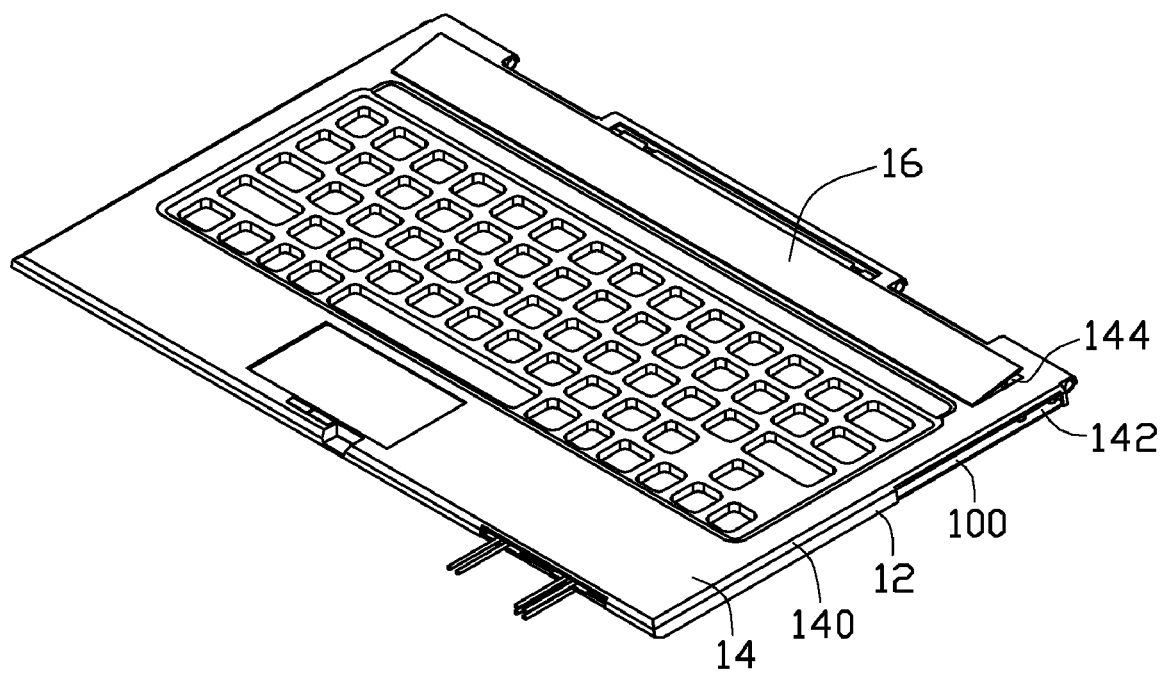
FIG. 2 is an assembled, isometric view of a main body of the portable electronic device of FIG. 1.
Figure 3:
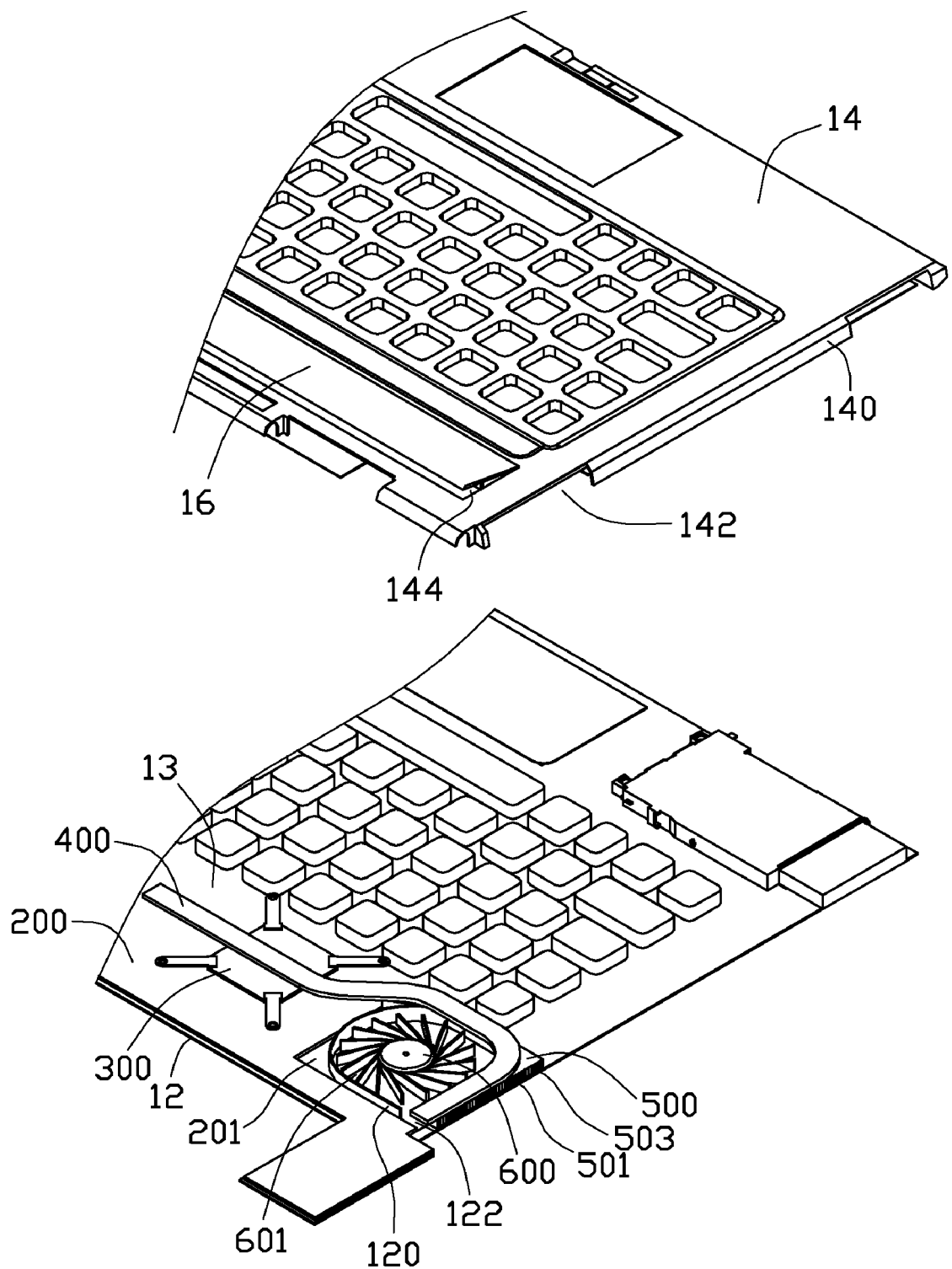
FIG. 3 is an exploded view of the main body of FIG. 2.

The display unit 20 is pivotably attached to the main body 10 so that the display unit 20 can be opened or closed relative to the main body 10. The display unit 20 includes a display panel, such as a high-brightness and high-efficiency liquid crystal display (LCD) panel. Referring to FIGS. 2 and 3, the main body 10 includes a casing 100 which encloses therein a motherboard 200. The motherboard 200 is provided thereon with an electronic component, such as, a central processor. In addition, the main body 10 further includes a memory, a CD-ROM drive, hard discs, and a battery, which are all disposed in the casing 100 and electrically coupled with the motherboard 200. The casing 100 includes a detachable top wall 14, an opposite bottom wall 12 and a side wall 140 extending downwardly from an outer periphery of the top wall 14 towards the bottom wall 12. The top wall 14 has keys of a keyboard extending upwardly therethrough for users to input data. The motherboard 200 is arranged on a top surface of the bottom wall 12. The top wall 14, the bottom wall 12 and the side wall 140 cooperatively defines a space 13 for receiving a heat dissipation device therein.

The heat dissipation device includes a heat absorbing plate 300 mounted on the electronic component of the motherboard 200, a heat sink 500 located adjacent to the electronic component for dissipating heat generated thereby, a heat pipe 400 thermally connected the heat absorbing plate 300 with the heat sink 500, and a centrifugal fan 600 for providing a forced airflow through the heat sink 500 to increase heat dissipation effectiveness of the heat sink 500.

The heat sink 500 is located adjacent to a lateral side edge of the bottom wall 12. The heat sink 500 includes a plurality of fins 501 being paralleled to and spaced from each other. In this embodiment, the heat sink 500 is arranged on a rear, left corner of the bottom wall 12. An airflow channel 503 is defined between each two neighboring fins 501. The side wall 140 defines an opening 142 facing the airflow channels 503 of the fins 501. Each airflow channel 503 of the heat sink 500 communicates an interior of the casing 100 with an outside environment via the opening 142.

The motherboard 200 defines a cutout 201 at a corner adjacent to the heat sink 500. The centrifugal fan 600 is positioned in the cutout 201 of the motherboard 200 and directly arranged on the top surface of the bottom wall 12. The centrifugal fan 600 includes an impeller 601 and a volute side plate 120 extending upwardly and perpendicularly from the bottom wall 12 of the casing 100. The side plate 120 is disposed around the impeller 601, and spaces a distance from the impeller 601, thereby defining a volute airflow passage therebetween. An air outlet 122 is defined in the side plate 120. The air outlet 122 is spaced from the side wall 140 and faces the opening 142 of the side wall 140. The fins 501 are arranged in the air outlet 122 of the centrifugal fan 600. The airflow channel 503 of each two neighboring fins 501 extends from the air outlet 122 of the centrifugal fan 600 towards the opening 142 of the side wall 140, whereby an airflow generated by the centrifugal fan 600 inside the casing 100 can be advantageously guided and discharged out of the casing 100 via the fins 501.

Figure 5:
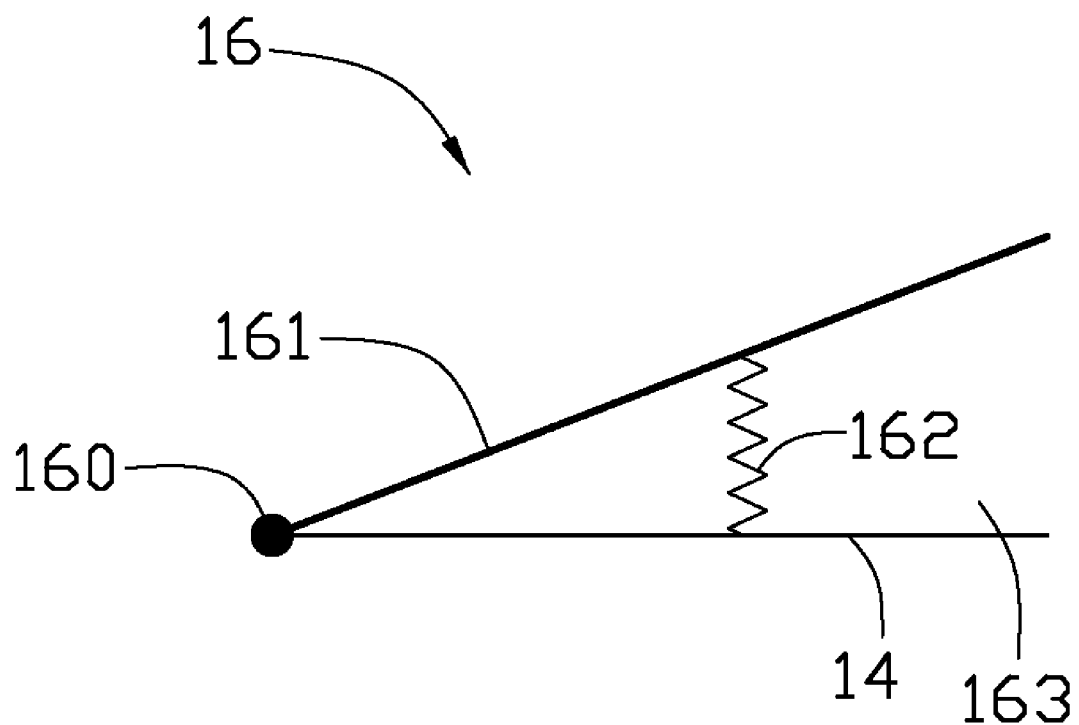
FIG. 5 is a schematic view of an active air intake mechanism of the main body of FIG. 2.

The top wall 14 defines an elongated groove 144 just above the heat dissipation device. The elongated groove 144 is rectangular. An active air intake mechanism 16 is formed on the top wall 14, which is located corresponding to the elongated groove 144. Referring to FIG. 5, the active air intake mechanism 16 includes an active cover plate 161, a pivot 160 formed at a longitudinal side edge of the cover plate 161 for pivotably connecting the cover plate 161 to the top wall 14, and a first and a second springs 162 with top ends thereof connected to left and right sides of the cover plate 161 and bottom ends thereof connected to the top wall 14 defining lateral sides of the elongated groove 144, wherein only one spring 162 is visible in FIG. 5. The cover plate 161 has a size substantially equal to that of the elongated groove 144.

When the display unit 20 is opened relative to the main body 10, the springs 162 are expanded to their natural state, whereby the cover plate 161 is pushed upwardly by the springs 162 and pivoted around the pivot 160 with respect to the top wall 14, and an air intake 163 is formed between the cover plate 161 and the top wall 14 to expose the elongated groove 144. The air intake 163 has a triangle-shaped configuration as viewed from a lateral side of the electronic device 30. Thus, the elongated groove 144 communicates the interior of the casing 100 with the outside environment via the air intake 163, so that the air intake 163 can function as a first air inlet of the centrifugal fan 600 and the centrifugal fan 600 can inhale cool air into the interior of the casing 100 from the outside environment via the air intake 163 and the elongated groove 144. When the display unit 20 is closed relative to the main body 10, the springs 162 are compressed by the display unit 20. Simultaneously, the cover plate 161 pivots around the pivot 160 towards the elongated groove 144 under the pressure of the display unit 20, and finally the cover plate 161 is fittingly received in the elongated groove 144 to completely seal the elongated groove 144 of the top wall 14.

Figure 4:
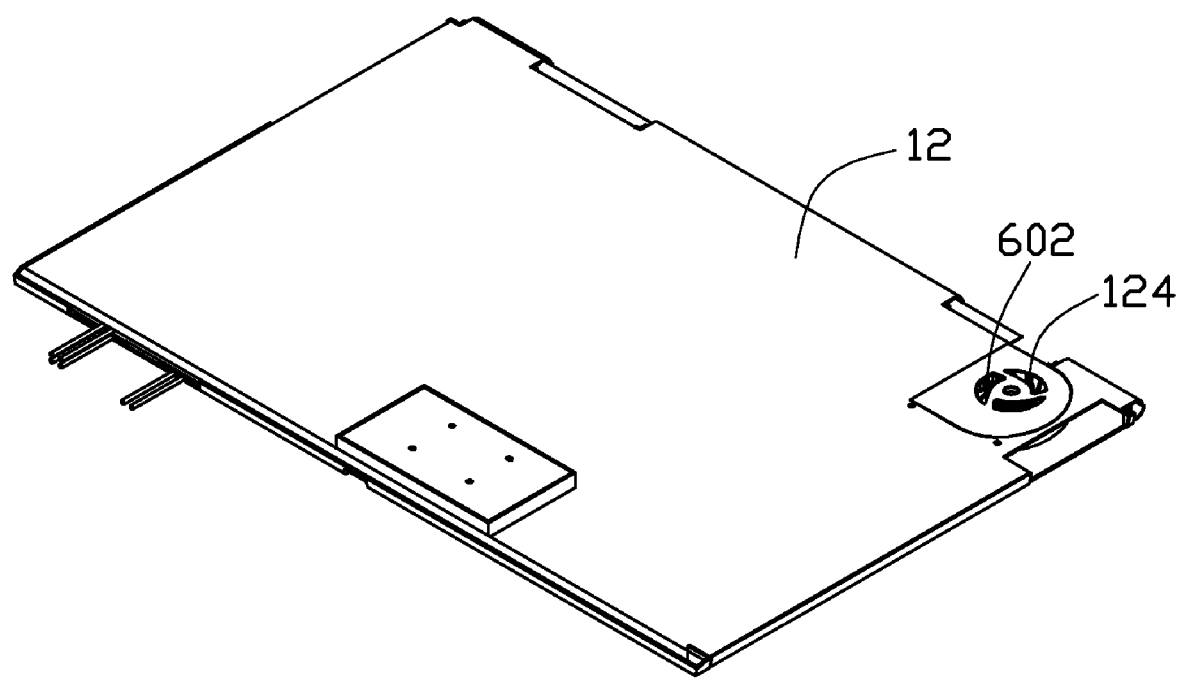
FIG. 4 is an inverted view of the main body of FIG. 2.

Referring back to FIG. 4, the bottom wall 12 defines an air intake 124 just under the impeller 601 of the centrifugal fan 600. The air intake 124 is circular. A supporting base 602 is formed in a central portion of the air intake 124 for mounting the impeller 601 thereon. The air intake 124 functions as a second air inlet of the centrifugal fan 600. The heat pipe 400 is substantially L-shaped, and includes an evaporator end connected to the heat absorb plate 300 and a condenser end connected to the heat sink 500.

Upon use of the notebook computer by moving the display unit 20 to an upright position relative to the main body 10, the springs 162 are expanded since the pressure from the display unit 20 no longer acts thereon. The expanded springs 162 push the cover plate 161 upwardly to expose the elongated groove 144. The cooling air in the outside environment is sucked into the interior of the casing 100 by the impeller 601 through the air intake 163 of the top wall 14 and the air intake 124 of the bottom wall 12 simultaneously, and discharged through the air outlet 122 towards the heat sink 500. The heat absorbing plate 300 absorbs heat from the electronic component; and the heat is transferred to the heat sink 500 via the heat pipe 400. The cooling air is blown into the airflow channels 503 of the fins 501 to take the heat therefrom. Finally, the airflow is exhausted out of the casing 100 to the outside environment via the opening 142. Thus, the fins 501 are forcibly cooled by the cooling air sucked into the interior of the casing 100. The heat spread on the fins 501 is carried away by the airflow of the cooling air and is further radiated to the outside environment from the opening 142 of the side wall 140. Furthermore, since the air intake 163 defined in the top wall 14 and the air intake 124 defined in the bottom wall 12 respectively functions as the first and second air inlets of the centrifugal fan 600, a housing for defining a first and second air inlets of the conventional centrifugal fan can be omitted in the present centrifugal fan 600. Thus, no vertical clearance is required between the housing and the casing in the present portable electronic device 30, which makes better use of the limited space in the casing 100 of the portable electronic device 30.

Figure 6:
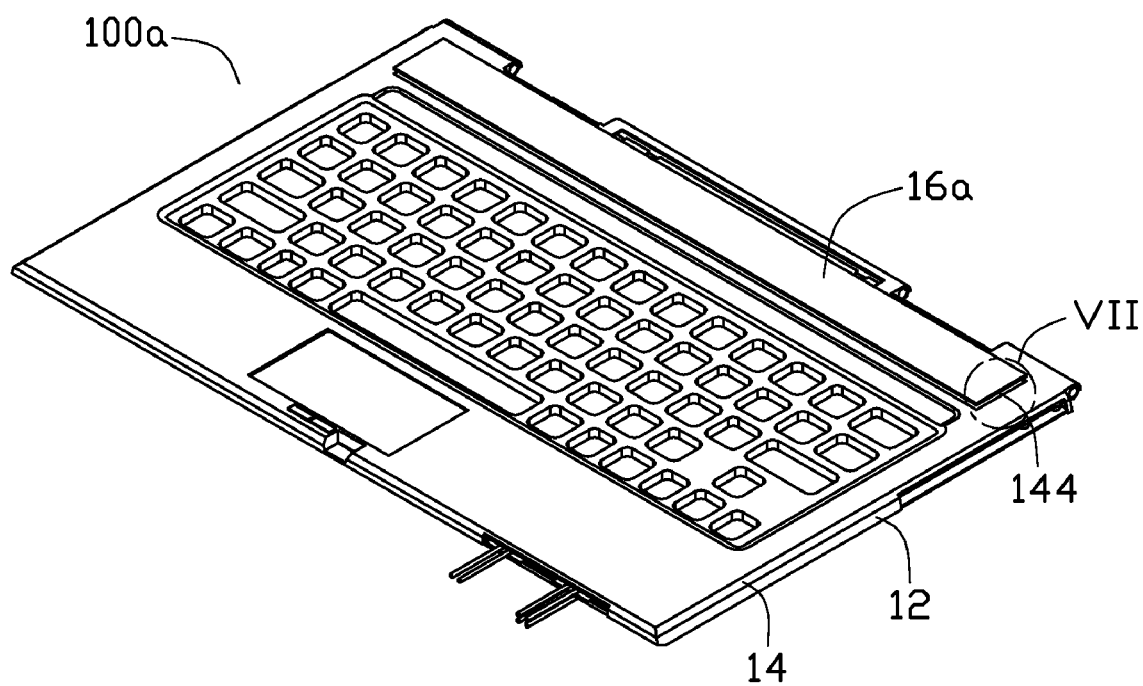
FIG. 6 is an assembled, isometric view of a main body of a portable electronic device in accordance with a second embodiment.
Figure 7:
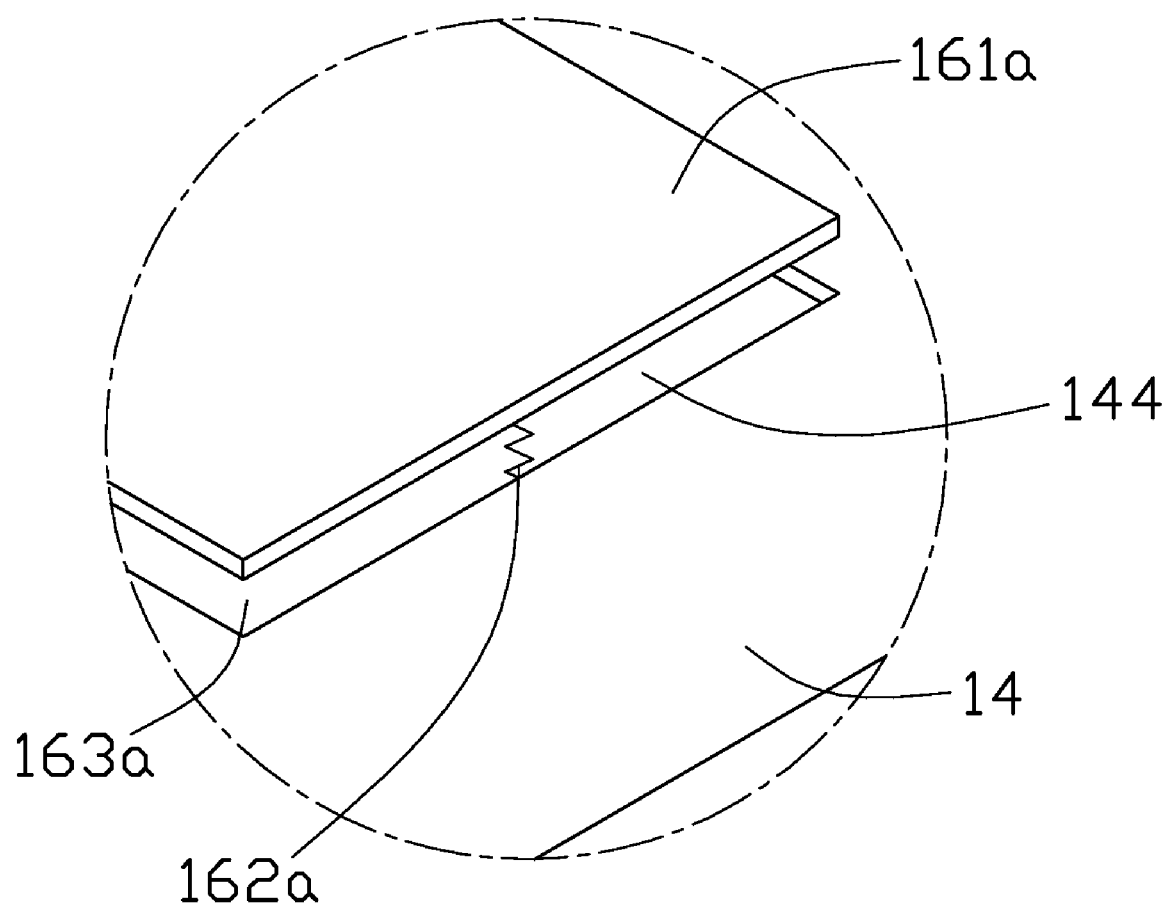
FIG. 7 is an enlarged view of a circled portion VII of the main body of FIG. 6.

FIGS. 6 and 7 show a main body 100a of a portable electronic device in accordance with a second embodiment. The difference between this main body 100a and the main body 100 illustrated in the first embodiment lies in an active air intake mechanism 16a of the top wall 14. In the present embodiment, the active air intake mechanism 16a includes an active cover plate 161a positioned corresponding to the elongated groove 144, and four springs 162a with top ends connecting with four sides of the cover plate 161a and bottom ends connecting with the top wall 14 defining four sides of the elongated groove 144.

When the display unit 20 is opened relative to the main body 10, the springs 162a are expanded, the cover plate 161a is pushed upwardly from the top wall 14 by the expanded springs 162a to leave the elongated groove 144, in which the cover plate 161a is located above and parallel to the top wall 14. A rectangular air intake 163a is formed between the cover plate 161a and the top wall 14 to expose the elongated groove 144. The air intake 163a has a rectangular-shaped cross section as viewed from each of four sides of the portable electronic device 30. When the display unit 20 is closed relative to the main body 10, the springs 162a are compressed by the display unit 20. Simultaneously, the cover plate 161a moves towards the elongated groove 144 under the pressure of the display unit 20, and finally the cover plate 161 is fittingly received in the elongated groove 144 to completely seal the elongated groove 144 of the top wall 14.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
    a display unit;
    a main body comprising a rear side edge to which the display unit is pivotably connected between open and closed positions, the main body comprising a bottom wall, an opposite top wall and a side wall connecting the top wall with the bottom wall, the bottom wall, the top wall and the side wall cooperatively defining a space in the main body, a groove being defined in the top wall for communicating the space with an outside environment of the main body, an opening being defined in the side wall for communicating the space with the outside environment, the top wall being provided with an active cover plate located corresponding to the groove, the cover plate being activated and moving upwardly relative to the top wall and being located above the groove with an air intake being defined between the cover plate and the top wall and being exposed when the display unit is pivoted to the open position relative to the main body, the air intake communicating with the groove, and the cover slate being received in the groove when the display unit is closed relative to the main body; and
    a centrifugal fan being received in the space of the main body, wherein the centrifugal fan defines an air outlet at one side, a plurality of fins being received in the air outlet and located adjacent to the opening, and the centrifugal fan sucking air into the space from the outside environment via the air intake and the groove.

2. The portable electronic device of claim 1, wherein the cover plate is supported in the groove by a plurality of springs, a lateral side edge of the cover plate is pivotably connected to the top wall, and when the display unit is opened relative to the main body, the springs push the cover plate upwardly to cause the cover plate to pivot relative to the top wall, and wherein the air intake has a triangle-shaped cross section as viewed from a lateral side of the portable electronic device.

3. The portable electronic device of claim 1, wherein the cover plate is supported in the groove by a plurality of springs, and when the display unit is opened relative to the main body, the springs push the cover plate upwardly, and wherein the cover plate is parallel to the top wall, and the air intake has a rectangular-shaped cross section as viewed from each side of the portable electronic device.

4. The portable electronic device of claim 1, wherein the bottom wall defines an air inlet under the centrifugal fan, a supporting base being located in a central portion of the air inlet for mounting an impeller of the centrifugal fan thereon.

5. The portable electronic device of claim 1, wherein the groove is elongated and located adjacent to the rear side edge of the main body.

6. A portable electronic device comprising:
a main body comprising a bottom wall, an opposite top wall and a side wall connecting the top wall with the bottom wall, the bottom wall, the top wall and the side wall cooperatively defining a space in the main body, a groove being defined in the top wall for communicating the space with an outside environment of the main body, the top wall being provided with an active cover plate corresponding to the groove, a plurality the cover plate with the top wall, and a lateral side edge of the cover plate being pivotably connected to the top wall;
a display unit pivotably attached to a side edge of the main body, wherein when the display unit is closed relative to the main body, the cover plate is received in the groove, and when the display unit is opened relative to the main body, the springs push the cover plate upwardly to cause the cover plate to pivot relative to the top wall to form an air intake between the cover plate and the top wall, the air intake having a triangle-shaped cross section as viewed from a lateral side of the portable electronic device; and
a centrifugal fan being received in the space of the main body, the centrifugal fan sucking air into the space from the outside environment via the air intake and the groove.

7. The portable electronic device of claim 6, wherein the centrifugal fan comprises an impeller located under the groove and a side plate around the impeller, the side plate defined with an air outlet, an opening being defined in the side wall for communicating the space with the outside environment, and a plurality of fins being received in the air outlet of the centrifugal fan and located adjacent to the opening.

8. The portable electronic device of claim 7, wherein the side plate extends upwardly from the bottom wall towards the top wall, and the side plate is spaced a distance from the impeller thereby defining a volute airflow passage therebetween.

9. A portable electronic device comprising:
a main body comprising a bottom wall, an opposite top wall and a side wall connecting the top wall with the bottom wall, the bottom wall, the top wall and the side wall cooperatively defining a space in the main body, a groove being defined in the top wall for communicating the space with an outside environment of the main body, the top wall being provided with an active cover plate corresponding to the groove, wherein the cover plate is located above and parallel to the top wall, and a plurality of springs connect the cover plate with the top wall;
a display unit pivotably attached to a side edge of the main body, wherein when the display unit is closed relative to the main body, the cover plate is received in the groove, and when the display unit is opened relative to the main body, the springs push the cover plate upwardly relative to the top wall with an air intake being defined between the cover plate and the top wall, the air intake having a rectangular-shaped cross section as viewed from each side of the portable electronic device; and
a centrifugal fan being received in the space of the main body, the centrifugal fan sucking air into the space from the outside environment via the air intake and the groove.

10. The portable electronic device of claim 9, wherein the centrifugal fan comprises an impeller located under the groove and a side plate around the impeller, the side plate defined with an air outlet, an opening being defined in the side wall for communicating the space with the outside environment, and a plurality of fins being received in the air outlet of the centrifugal fan and located adjacent to the opening.

11. The portable electronic device of claim 10, wherein the side plate extends upwardly from the bottom wall towards the top wall, and the side plate is spaced a distance from the impeller thereby defining a volute airflow passage therebetween.

* * * * *